United States Patent
Turski et al.

(10) Patent No.: US 7,257,571 B2
(45) Date of Patent: Aug. 14, 2007

(54) AUTOMATIC QUERY CLUSTERING

(75) Inventors: Andrzej Turski, Redmond, WA (US); Richard F. Rashid, Redmond, WA (US); Matthew MacLaurin, Woodinville, WA (US); Lili Cheng, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 502 days.

(21) Appl. No.: 10/764,738

(22) Filed: Jan. 26, 2004

(65) Prior Publication Data
US 2005/0165825 A1 Jul. 28, 2005

(51) Int. Cl.
G06F 17/30 (2006.01)
G06F 19/00 (2006.01)
(52) U.S. Cl. ................. 707/3; 707/4; 700/92
(58) Field of Classification Search ............. 707/1, 707/3–4, 5
See application file for complete search history.

(56) References Cited

U.S. PATENT DOCUMENTS

| | | | |
|---|---|---|---|
| 5,801,699 | A | 9/1998 | Hocker et al. |
| 6,415,282 | B1 * | 7/2002 | Mukherjea et al. ............ 707/3 |
| 6,539,374 | B2 | 3/2003 | Jung |
| 6,578,032 | B1 | 6/2003 | Chandrasekar et al. |
| 6,606,613 | B1 | 8/2003 | Altschuler et al. |
| 2002/0169764 | A1 * | 11/2002 | Kincaid et al. ............... 707/3 |
| 2003/0200198 | A1 * | 10/2003 | Chandrasekar et al. ........ 707/1 |
| 2004/0093321 | A1 * | 5/2004 | Roustant et al. .............. 707/3 |
| 2005/0278321 | A1 * | 12/2005 | Vailaya et al. ................. 707/3 |

OTHER PUBLICATIONS

T. Zhang, R. Ramakrishnan, and M. Livny. BIRCH: An Efficient Data Clustering Method for Very Large Databases. In Proc. of the 1996 ACM SIGMOD International Conference on Management of Data, Montreal, Canada, pp. 103-114.

G.L. Somlo and A.E. Howe. Incremental Clustering for Profile Maintenance in Information Gathering Web Agents. In Proc. Of the fifth International Conference on Autonomous Agents, pp. 262-269, 2001.

* cited by examiner

Primary Examiner—Alford W Kindred
(74) Attorney, Agent, or Firm—Amin, Turocy & Calvin, LLP (57) ABSTRACT

The present invention relates to a system and methodology for automatic clusterization and display of data items in a local or remote database system. Such clusterization can be based on properties associated with the data items such as a type, location, people, date, time, user-defined, and so forth, wherein an initial property may be employed to form a first level of clusterization and a subsequent property may be automatically determined to form an optimized clusterization from which to find and retrieve desired information. A computerized interface for organizing and retrieving data is provided. The interface includes a property analyzer to determine an item distribution for at least two cluster properties and an organizer that forms new clusters based in part on the item distribution.

24 Claims, 12 Drawing Sheets

All Items of type 'Source Files' on This Computer in Volume C:

by: Type Location Category People Date

- Dust (7)
- Dust2 (7)
- Dust3 (20)
- Szafir.Cache (5)
- Szafir.CacheTest (2)
- Szafir.Ctrl.OpenSave (6)
- Szafir.Ctrl.Table (4)
- Szafir.EmailHook (15)
- Szafir.ES (2)
- Szafir.Explorer (3)
- Szafir.FileSystem.Monitor (9)
- Szafir.FileSystem.Scanner (11)
- Szafir.OfficeHook (2)
- Szafir.Osql (1)
- Szafir.OutlookHook (9)
- Szafir.Setup.CustomAction (7)
- Szafir.Sharing.ShareCtrl (2)
- Szafir.Sharing.ShareExplorer (12)
- Szafir.Sharing.VShares (2)
- Szafir.Switcher (2)
- Szafir.Utils (5)
- Szafir.Viewer (54)
- WindowManager (43)

Viewer.cs   ItemView.cs   FilterBar.cs   Szafir.Sharin...   DbCache.cs

ListView.cs   ViewerStart.cs   GroupView.cs   DetailPane.cs   MainWindow...

ScrollView.cs   Menu.cs   NavMapPan...   Thumbnailer...   Menu.cs

NavPane.cs   buttonactor.cs   GroupActor.cs   BondDlg.cs   Explorer.cs

NavBar.cs   PhotoThum...   RowView.cs   ImageFileP...   MonitorForm...

All Items in 'VSS' by: Type Location Category People Date

- docs (45)
  - billg-3-24 (2)
- src (850)
  - Dust (371)
  - Dust2 (14)
  - Dust3 (34)
  - OfficePIA (3)
  - Szafir.Cache (10)
  - Szafir.CacheTest (4)
  - Szafir.Ctrl.OpenSave (11)
  - Szafir.Ctrl.Table (5)
  - Szafir.DB (3)
  - Szafir.EmailHook (32)
  - Szafir.ES (4)
  - Szafir.Explorer (5)
  - Szafir.FileSystem.Monitor (18)
  - Szafir.FileSystem.Scanner (22)
  - Szafir.OfficeHook (4)
  - Szafir.Osql (2)
  - Szafir.OutlookHook (18)
  - Szafir.Setup.CustomAction (8)
  - Szafir.Sharing.ShareCtrl (2)
  - Szafir.Sharing.ShareExplorer (81)

| Name | Store | Date |
|---|---|---|
| lh_close.png | This Computer;Volume C: | 5/27/2003 9:39:56 AM |
| lh_fwd_btn_up.png | This Computer;Volume C: | 5/27/2003 9:39:56 AM |
| lh_home.png | This Computer;Volume C: | 5/27/2003 9:39:56 AM |
| lh_star.png | This Computer;Volume C: | 5/27/2003 9:39:56 AM |
| sqz_closed_up.png | This Computer;Volume C: | 5/27/2003 9:39:56 AM |
| sqz_half_up.png | This Computer;Volume C: | 5/27/2003 9:39:56 AM |
| sqz_open_up.png | This Computer;Volume C: | 5/27/2003 9:39:56 AM |
| ViewBar.cs | This Computer;Volume C: | 5/23/2003 5:52:42 PM |
| Explorer.cs | This Computer;Volume D: | 5/20/2003 5:29:15 PM |
| Viewer.cs | This Computer;Volume D: | 5/20/2003 5:29:14 PM |
| GridView.cs | This Computer;Volume D: | 5/20/2003 5:29:14 PM |
| NavBar.cs | This Computer;Volume D: | 5/20/2003 5:29:14 PM |
| StdQuery.cs | This Computer;Volume D: | 5/20/2003 5:29:13 PM |
| DocumentDetailView.cs | This Computer;Volume D: | 5/20/2003 5:29:13 PM |
| EmailDetailView.cs | This Computer;Volume D: | 5/20/2003 5:29:10 PM |
| AssemblyInfo.cpp | This Computer;Volume D: | 5/20/2003 5:29:00 PM |
| MainWindow.cs | This Computer;Volume C: | 5/19/2003 3:00:27 PM |
| CloseBoxDisabled.bmp | This Computer;Volume C: | 5/19/2003 3:00:27 PM |
| CloseBoxEnter.bmp | This Computer;Volume C: | 5/19/2003 3:00:27 PM |
| CloseBoxHilite.bmp | This Computer;Volume C: | 5/19/2003 3:00:27 PM |
| fake_thumbnail.png | This Computer;Volume C: | 5/19/2003 3:00:27 PM |

610 — All Items in 'VSS' by: Type Location Category People Date

- Volume C: [522]
- Volume D: [376]

| Name | Store | Date |
|---|---|---|
| lh_close.png | This Computer:Volume C: | 5/27/2003 9:39:56 AM |
| lh_fwd_btn_up.png | This Computer:Volume C: | 5/27/2003 9:39:56 AM |
| lh_home.png | This Computer:Volume C: | 5/27/2003 9:39:56 AM |
| lh_star.png | This Computer:Volume C: | 5/27/2003 9:39:56 AM |
| sqz_closed_up.png | This Computer:Volume C: | 5/27/2003 9:39:56 AM |
| sqz_half_up.png | This Computer:Volume C: | 5/27/2003 9:39:56 AM |
| sqz_open_up.png | This Computer:Volume C: | 5/27/2003 9:39:56 AM |
| ViewBar.cs | This Computer:Volume C: | 5/27/2003 9:39:56 AM |
| Explorer.cs | This Computer:Volume D: | 5/23/2003 5:52:42 PM |

AUTOMATIC QUERY CLUSTERING

TECHNICAL FIELD

The present invention relates generally to computer systems, and more particularly to a system and methods that automatically organize information items into a smaller subset of items by analyzing an item distribution associated with various property clusters.

BACKGROUND OF THE INVENTION

One key aspect of a database-based operating system is an ability to find desired items quickly by executing a query that may involve a number of item properties. This should be compared to previous systems, which required the knowledge of a file location within a folder hierarchy to retrieve desired information, for example. While the query approach is very powerful, the success of newer systems generally depends on an ability to create a user interface (UI) that allows queries to be simple and intuitive for average users. In its native form, database queries (e.g., expressed in T-SQL language) are difficult to handle for professional programmers and typically inappropriate for end users.

One approach to the query problem is to expose user interface commands that provide direct access to some number of predefined queries. For example, a predefined query could be provided to find all the picture files on a disk (Picture Library), or all unread email. Furthermore, a system may suggest grouping results in a certain manner, e.g., the pictures may be automatically put into groups according to the date taken. Such patterns of predefined queries are useful for many common scenarios, but they are not general enough to unlock the full power of the database. Using the picture example, it may happen that all the pictures were taken the same day (or, maybe, the camera clock wasn't set,) in which case grouping by date is useless. The situation is even worse when dealing with $3^{rd}$ party properties (application-defined, administrator-defined, or user-defined). Since these properties are not known to the creators of the operating system, designing predefined queries for the properties may be almost impossible.

Another approach is to provide users an ability to query databases with textual queries that appear like a natural language. Such queries can be general enough from the database point of view and easy to understand for the users. However, if natural language queries that can take a totally free form are allowed, it is difficult to create a parser that will correctly understand the user's intention in each case. If some grammar restrictions are imposed, it becomes more difficult for users to form a syntactically correct query that can sometimes be worked around with chunk expressions. In either case, the very idea that the query text needs to be typed in may not be appealing to many users. Small kids, non-English users, and users of keyboard-less devices (e.g., Tablet PC) may all have problems with textual typing. Thus, there is a need for a query interface that has point-and-click simplicity for finding and retrieving information.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to automatic retrieval and display of desired information into a subset of easily manageable information clusters. In a file system user interface, navigating a large set of items such as by displaying the items as lists becomes problematic when attempting to find and retrieve desired information from such lists. The present invention provides an improved point-and-click interface that facilitates navigating a large set of items classified by associated properties of the items. Items clustered by these properties can be presented in a folder-like manner (or other display type), whereby automatic clusterization may be performed by a different or subsequent property to split or organize query results into an easily manageable subset of clusters. These subsets may then be selected to retrieve desired information or to perform other clustering procedures (e.g., nested clusterization). The best property to cluster on can be determined by analyzing an item distribution in various property clusters.

One aspect of the present invention provides an automatic selection of a clusterization property. In order to determine such properties, a problem can be stated as follows: Given a starting set of items, and a set of item properties that can be used for grouping, which property associated with the set of items offers the best-clustered results? By best-clustered results, the present invention attempts to provide a uniform grouping of results into a moderate number of clusters. Thus, cases when there are just a few clusters with a large number of items, or a large number of clusters with just a few items in each cluster are typically not desired in order to efficiently find and retrieve desired information.

The above problem can be solved by assigning a clusterization score to each item property and selecting the property with the highest score. The clusterization score can be calculated by multiplying together the number of items in each cluster. For N items, a function to calculate the clusterization score as a product of cluster sizes has its maximum when the items are split into $\sqrt{N}$ clusters, respective clusters having $\sqrt{N}$ items. For other distributions, the score is utilized to measure and compare how far the distribution is from an ideal distribution. An example of an alternative score function can be based on a binomial distribution, for example. For these type distributions, the score value has a statistical interpretation that provides a number of ways N_total items can be split into clusters of given size. The clusterization that has most value for the user is the one that mitigates the largest number of alternative distributions. To compare different properties that can be used for subsequent clusterization, clusterization scores can be calculated for all of the properties, wherein such calculations can be easily performed with a single pass through of a list of items.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The present invention relates to a system and methodology for automatic clusterization and display of data items in a local or remote database system. Such clusterization can be based on properties associated with the data items such as a type, location, people, date, time, user-defined, and so forth, wherein an initial property may be employed to form a first level of clusterization and a subsequent property may be automatically determined to form an optimized clusterization from which to find and retrieve desired information. In one aspect, a computerized interface for organizing and retrieving data is provided. The interface includes a property analyzer to determine an item distribution for at least two cluster properties and an organizer that forms new clusters based in part on the item distribution.

As used in this application, the terms "component," "analyzer," "cluster," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
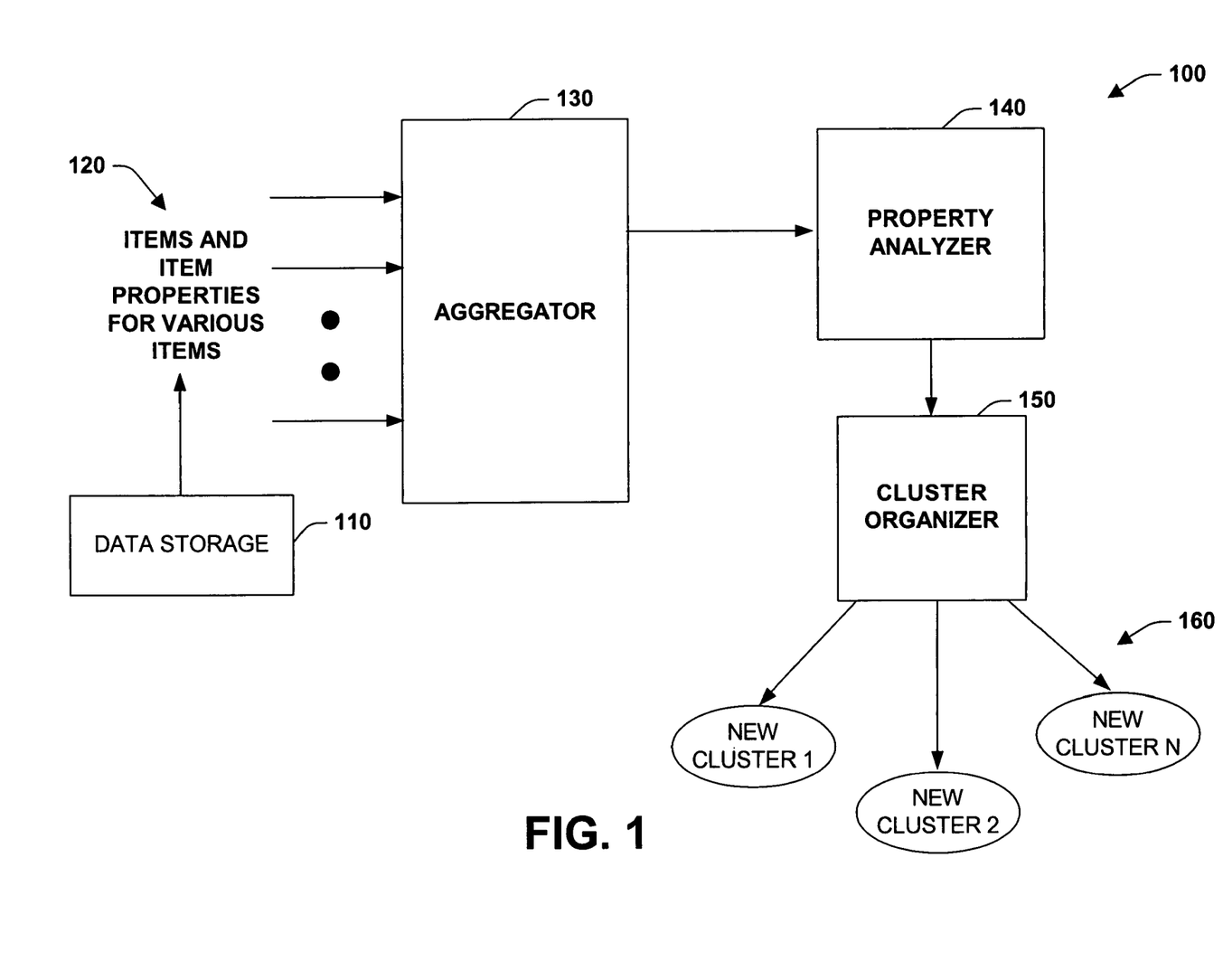
FIG. 1 is a schematic block diagram of a clustering system in accordance with an aspect of the present invention.

Referring initially to FIG. 1, a query clustering system 100 is illustrated in accordance with an aspect of the present invention. The system 100 includes a data storage 110 that stores a plurality of data items 120 to be displayed at a user interface (not shown). Such items 120 can include documents, files, folders, images, audio files, source code and so forth that can appear in various viewable states at the user interface which is described in more detail below. The items 120 are also associated with various properties (e.g., metadata) describing such aspects as an item's type (e.g., image, document, spreadsheet, binary, and so forth), date created, people associated with the item, location, category, user-defined property, and so forth. An aggregator 130 collects the items 120 and associated properties and presents the items to a property analyzer 130 that performs an analysis of respective items and properties. For example, such analysis can include automatically determining a score for various possible clustering scenarios or potential groupings for items.

Based upon the analysis by the analyzer 140, a cluster organizer 150 presents an optimized grouping of new clusters 160 to a user. The optimized grouping of clusters 160 facilitates finding and retrieving desired information from the data storage 110 which can include local storage mediums, remote storage mediums, or a combination of local and remote storage.

In one example of automatic clustering, a default top-level clusterization can group items by item type. In a user study, it was found that a first level grouping by item type is useful and well understood by the users. However, it was also found that a second level clusterization by another property is not obvious and difficult to discover. Thus, one aspect of the present invention is an automatic selection of a clusterization property. The problem can be stated as follows: Given a starting set of items, and a set of item properties that can be used for grouping, which property offers the best clustered results? By best or optimized clustered results, it is a goal to provide a uniform grouping of items into a moderate number of clusters.

The above goal can be achieved by assigning a clusterization score to each item property and selecting the property with the highest score. The clusterization score can be calculated by multiplying together the number of items in each cluster such as in the following equation:

$$\text{score} = n\_items_{cluster1} * n\_items_{cluster2} * \ldots$$

For N items, a function to calculate the clusterization score as a product of cluster sizes has its maximum when the items are split into $\sqrt{N}$ clusters, each cluster with $\sqrt{N}$ items. For other distributions, the score is used to measure and compare how far it is from the ideal or optimized distribution. It was found that the above score function produced reasonable results in test cases. However, it is noted that the score function utilized is an example. For example, other functions may be employed that provide different relative weights to the distributions off the ideal distribution.

An example of an alternative score function is based on binomial distribution as follows:

$$\text{score} = (N\_total)! / ((n\_items_{cluster1})! * (n\_items_{cluster2})! * \ldots)$$

In this example, the score value has a statistical interpretation that it provides a number of ways N_total items can be split into clusters of given size. The clusterization that has most value for the user is the one that mitigates the largest number of alternative distributions. To compare different properties that can be used for subsequent clusterization, the clusterization scores for all of the properties are calculated. This can be easily achieved with a single pass through the list of all items as is described in more detail in the process outlined in FIG. 2.

Figure 2:
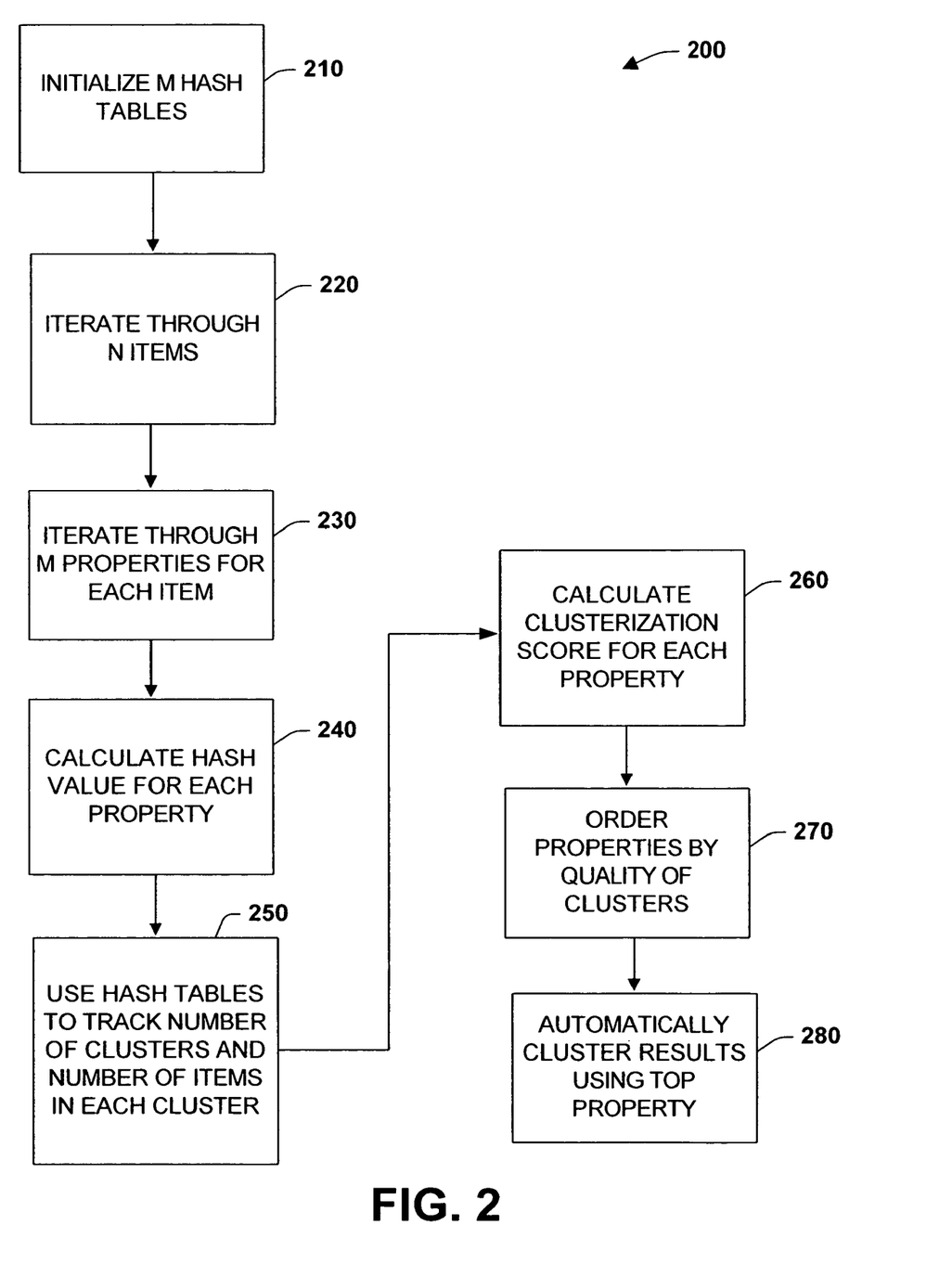
FIG. 2 is a flow diagram illustrating an automatic query clustering process in accordance with an aspect of the present invention.

FIG. 2 is a flow diagram illustrating an automatic clusterization process 200 in accordance with an aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Assuming there are N items and M properties to compare, the process 200 may be employed as follows: At 210, initialize M hash tables. At 220, iterate through N items. At 230, for each item, iterate through M properties. At 240, for each item property, calculate a hash value. A hash function is selected in such a way, that two property values going into the same cluster return the same hash value. For example, when clustering date/time property the hash function may be based on the date part only, ignoring the time part. At 250, the hash tables are employed to track the number of clusters and number of items in each cluster. At 260, a clusterization score is calculated for each property using the data from its associated hash table.

At 270, the properties on the list are ordered by the quality of clusters they may produce. If the number of items exceeds some threshold (e.g., more then 10 items,) the results may be automatically clustered using the property on the top of the list at 280. Also, other clusters may be suggested that are next in order as alternatives. For example, when selecting all the items of type email message, the above process automatically clusters the results by the message sender in test cases for email messages. However, selecting the items of type Word Document, for example, clusters were created based on the last modification date, whereas items of type C# source files were grouped by their folder containment (which corresponded to a grouping by programming project). The general nature of the above approach allows determining a grouping algorithm which is most appropriate for a given set of items, including in the evaluation of custom and 3$^{rd}$ party properties as well.

FIGS. 3-10 illustrate various example user interfaces that illustrate one or more of the automatic clustering systems and processes previously described. It is noted that these interfaces may include a display having one or more display objects including such aspects as configurable icons, buttons, sliders, input boxes, selection options, menus, tabs and so forth having multiple configurable dimensions, shapes, colors, text, data and sounds to facilitate operations with the system 100. In addition, the interface can also include a plurality of other inputs or controls for adjusting and configuring one or more aspects of the present invention and as will be described in more detail below. This can include receiving user commands from a mouse, keyboard, speech input, web site, remote web service and/or other device such as a camera or video input to affect or modify operations of the interface or other aspects of the system 100.

The following discussion describes various aspects of the present invention and is related to the example interfaces depicted in FIGS. 3-10. When designing a folder or other type structure, designers (whether it's an application programmer or an end user) have high degree of freedom, which allows hiding unimportant or rarely used items from the top level view by putting the items into a hidden folder. Similarly, when creating a property based browser, various mechanisms can be provided to hide properties that are meaningless or otherwise not very useful—even if the clustering algorithm determines a high score.

Property up/downgrading can be considered at different levels. At the application level, application designer can indicate which properties are the primary properties to be exposed in the user interface, and which are secondary or auxiliary ones. This is typically to be defined separately for each item type. Automatic query clustering described in the previous section generally considers the primary properties. Moreover, each item type should define property mapping for the properties that are common to all items. For example, a common Date property can be mapped to Date Taken for pictures, but mapped as Last Modification Date for documents. Similarly, a People field can be Author for documents but Sender for email, and so forth.

Generally, it is the user who should be able to decide which properties are best to view their respective data. There may be an explicit UI to promote or demote any particular property, but the present invention can also learn implicitly from user actions (e.g., via learning algorithms). Each property may have its weight which gets increased when the user switches from a different property clusterization to another one, and decreased when they switch out. A final rating of each property (used to decide which property to cluster on) is a product of the property weight and the clusterization score (calculated according to the formulas described above).

As discussed above, users generally prefer a hierarchical organization of item type clusters over a flat list. The hierarchy introduced some type of order and made it easier to find the requested item type value. The same should be true for any property that has more then a few different property values. The following describes specific example techniques for organizing property values into a hierarchical view.

In the case of regular files, item type is defined by the file extension. User-friendly names for the file types can be used as defined by current viewer programs. Different file extensions that resulted in the same friendly name were generally already grouped together (e.g., both .h and .hxx are called C/C++ Header Files). In addition, one more level of hierarchy can be introduced by grouping all the files of similar type. In a prototype, metagroups of Document Files, Picture Files, Music and Video Files, Programming Files, and Other Files were considered and processed. Also, people metagroups may be processed as class objects.

For example, a list of item type=people can be split into smaller sections by the type of communication channel that can be used to reach a given person. This includes groups of people that can be reached by post mail, by phone, by instant messaging, or by email, for example. Each of these groups can be divided further, if desired. For example, in a corporate environment, email addresses can be split into internal (derived from the corporate address book) and external (usually from the user's personal contact list.) Some people may have multiple methods of communication, in which case they may end up in multiple clusters. Property clusters, unlike traditional folders, have no restriction that the item is in one place only.

Folders represent a user-created grouping of items. While it is expected that over time that property-based clustering of items will diminish the need for and significance of folders, folders can still be supported. Folders are generally organized hierarchically and folder clusters should resemble this hierarchy. One disadvantage of the folder hierarchy is that it includes a number of directories of little interest to the user, like Program Files or the Windows directory. When using existing folders to organize items into clusters, an obvious improvement is to display only a part of the folder hierarchy that does contain some of the items in the view.

Figure 3:
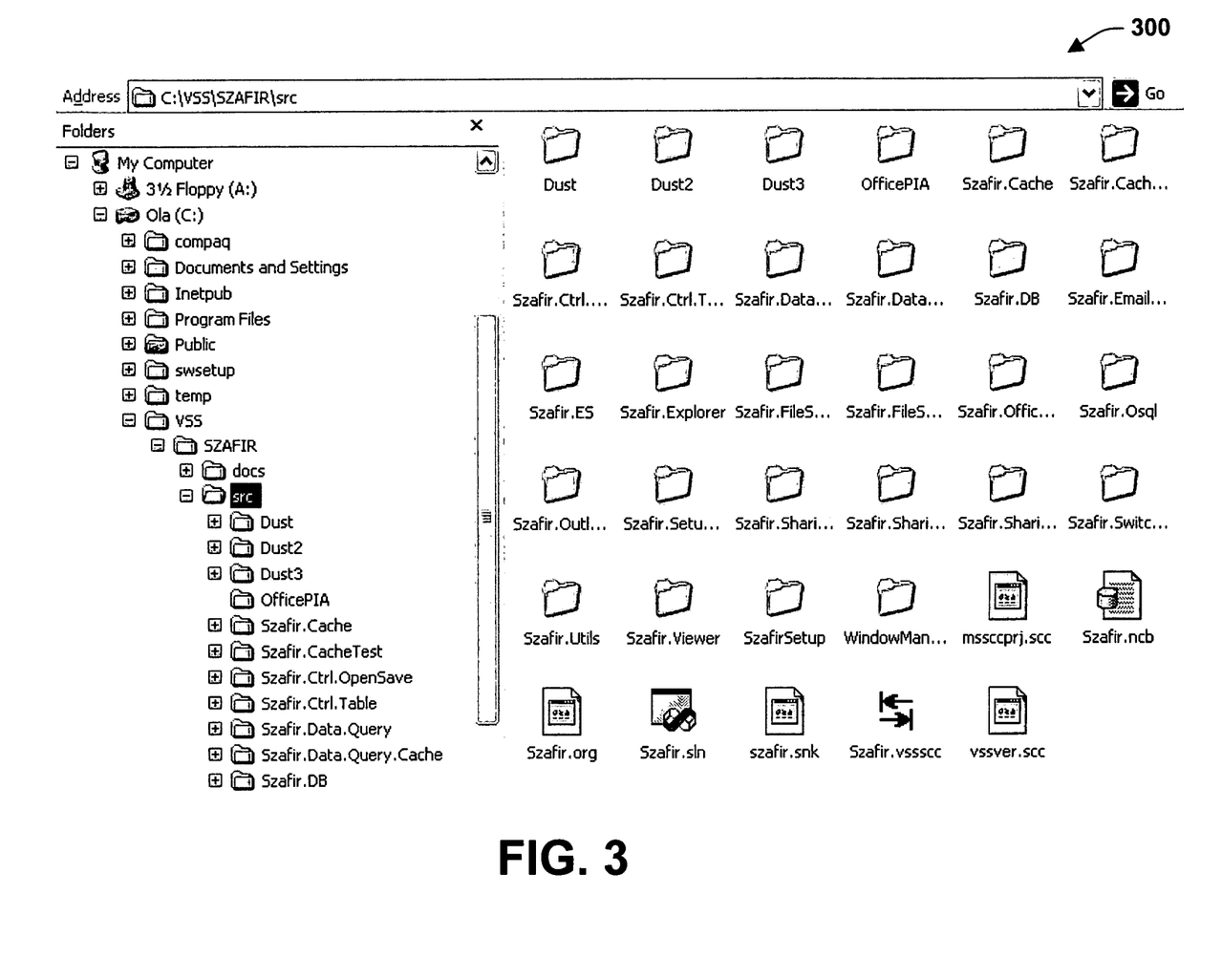
FIGS. 3-10 illustrate example user interfaces for automatic query clustering in accordance with an aspect of the present invention.

FIG. 3 is a sample interface 300 that contains programming files on (Volume C:). In Windows Explorer, for example, the view includes the full folder structure. In a prototype, clustering files by "category" includes only folders related to the actually selected set of items (subset of the full folder tree.)

Figure 4:
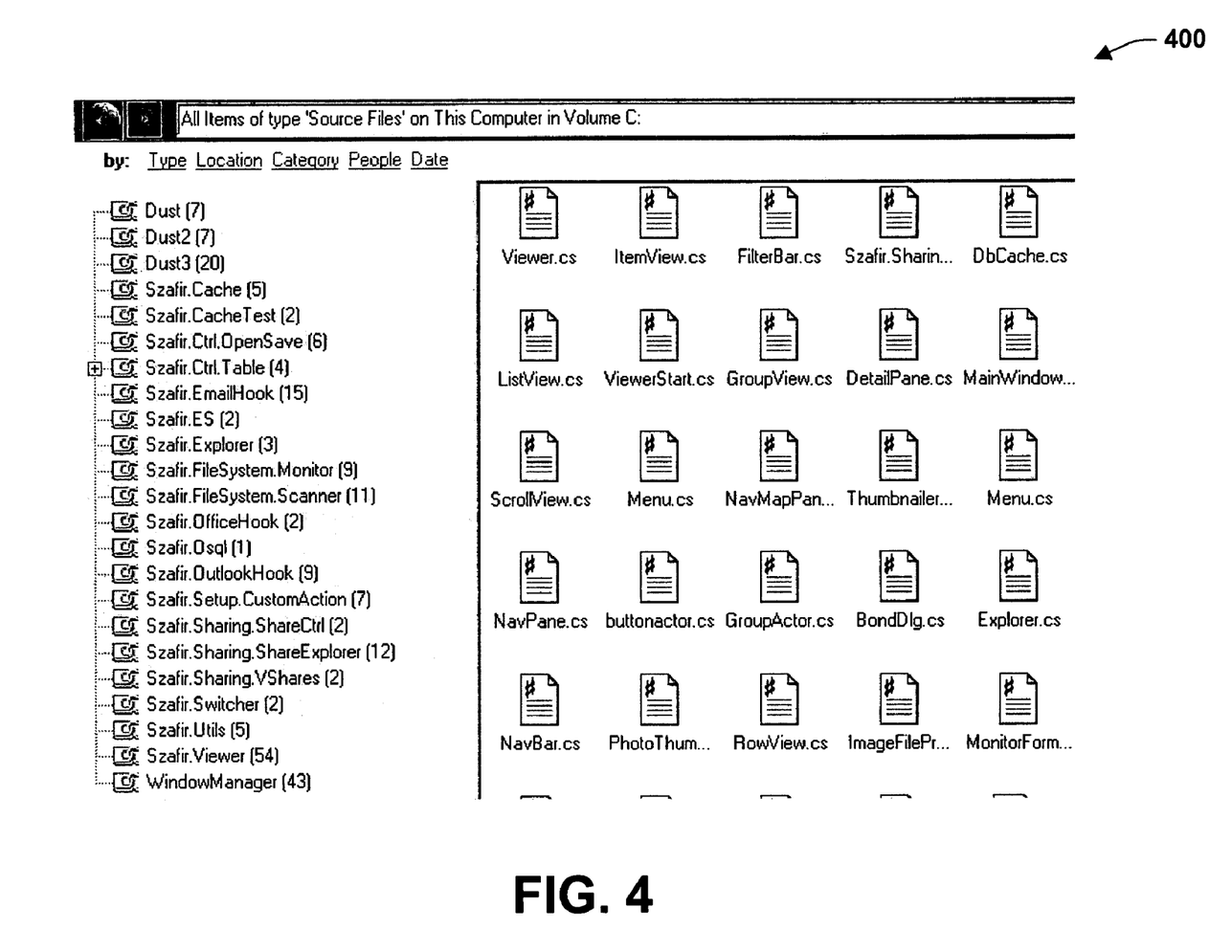

FIG. 4 is an interface 400 that demonstrates clustering by folders. Another aspect of a folder hierarchy is that it joins the concept of physical location (this or that disk, or an external share) with a logical one (placement in a folder hierarchy.) Since logical groups may be created that may span several physical locations, the physical location may be separated from the folder property and thus present folders having the same name together, regardless of their physical location. As can be appreciated, grouping by location is also provided.

Figure 5:
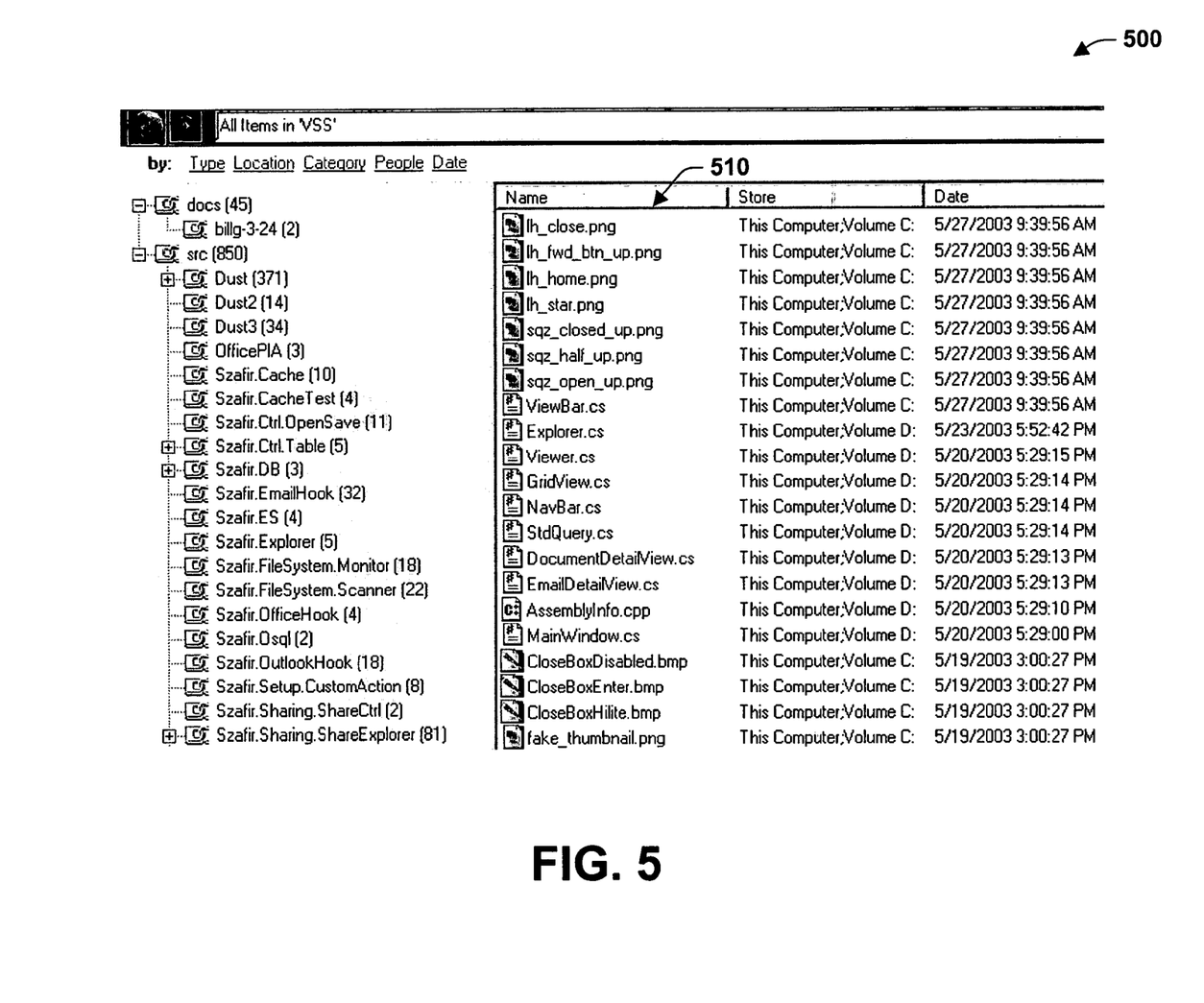
Figure 6:
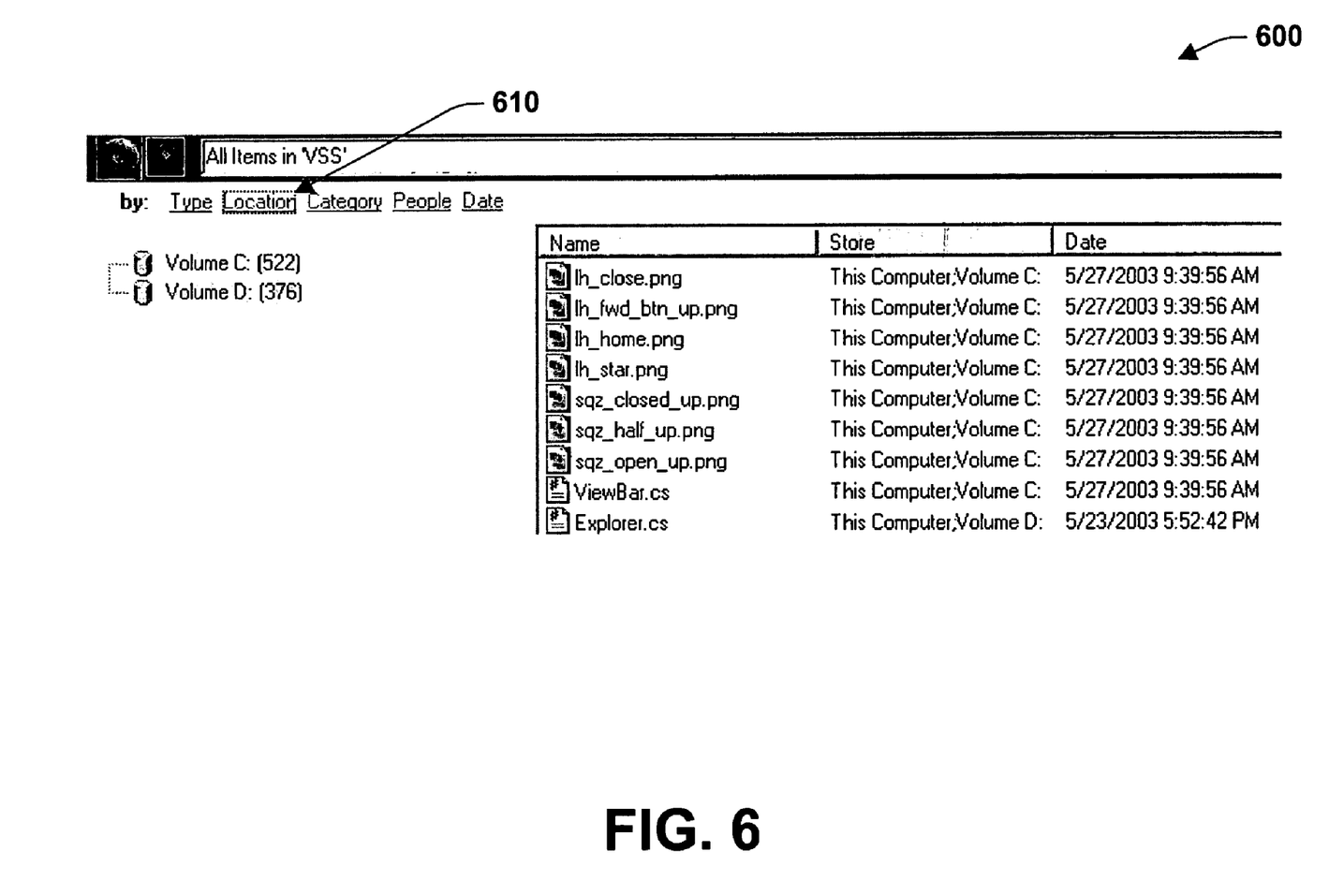

FIG. 5 is an example interface 500 of a folder (VSS) that exists on two drives (Volume C: and Volume D:) When looking at the "category" VSS, the interface 500 combines the folder content from the physical locations at 510. This functionality is based on the assumption that if two or more folders have the same name it happens on purpose. If this is not the case, the files can be easily separated by a location property 610 in a user interface 600 depicted in FIG. 6.

Figure 7:
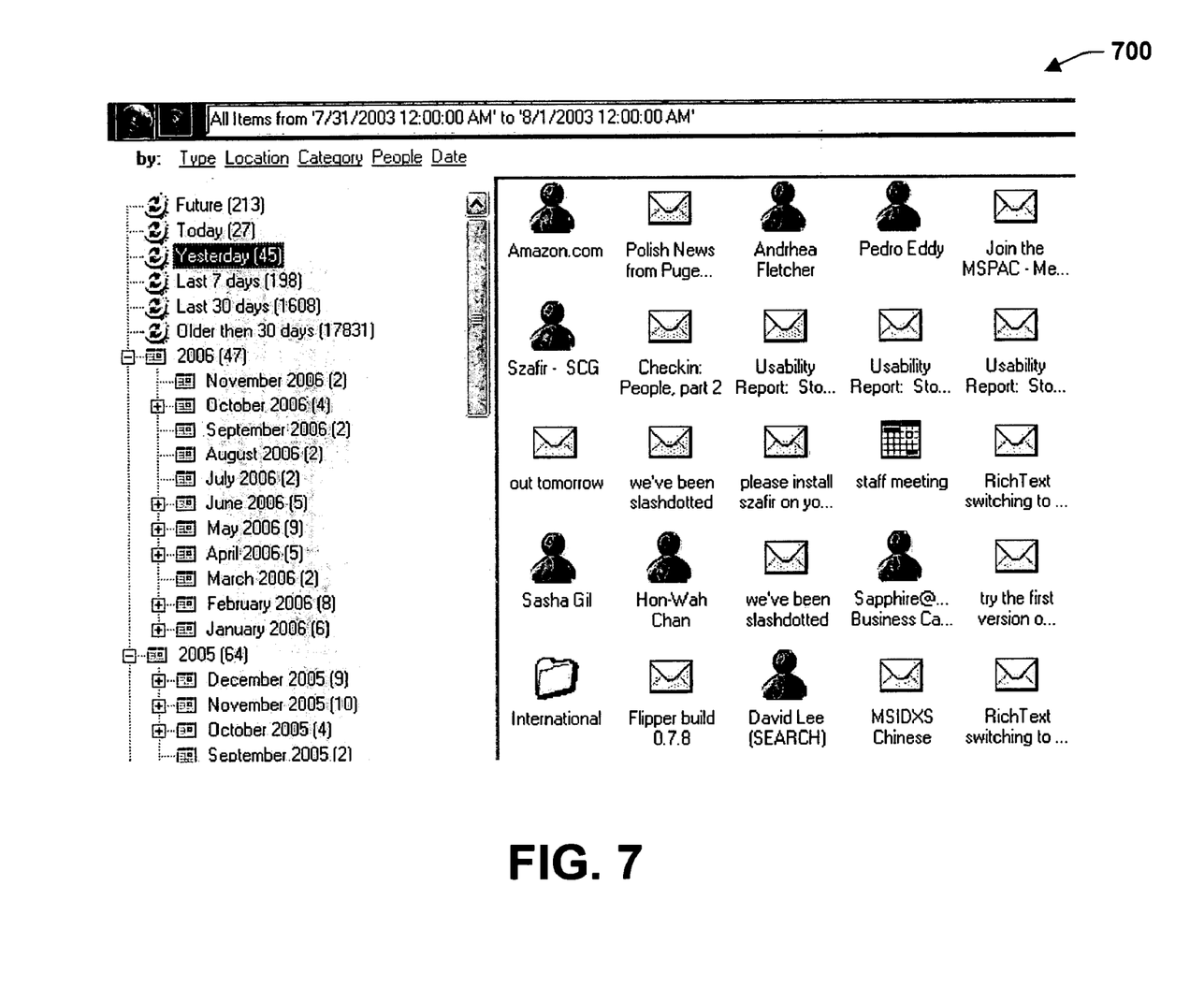

FIG. 7 is an interface 700 illustrating clustering by date properties. Clustering by date and time has a natural year/month/day/hour/minute hierarchy. However, there is also a concept of relative time—relative to now. It is believed both concepts are important. Date clusters include a number of predefined queries (dynamic groups) that include items from today, yesterday, and so forth.

One interesting item classifications is by associating items with people. There are many item properties that may be used to create such associations, for example, sender or recipient for email messages or attachments, author for documents, person pictured for photographs, and so forth. Clustering items by people may pose a special challenge because of social connotations carried by any presentation of people hierarchy. For example, people may be grouped by some formal attributes, like Internal or External Contacts, but some of these groups may still be too large to be handled efficiently. For example, the list of internal contacts referenced by a sample email message has about 5,000 names.

The list can be ordered alphabetically or grouped by first letters (dictionary-like,) but any list that long is generally difficult to comprehend. One problem is that names of the people significant to a user are obscured by names of little known people that are there by accident. It can be assumed that most significant contacts are those that were emailed by the user most often and most recently, or who were the authors or co-authors of documents on the user's disk, and so forth. Using some weighted analysis, a list of all people ordered by their relative significance to the user can be constructed.

However, presenting a long list of people names ordered by their calculated significance may not be an acceptable solution. The calculated order may be accidental and not correctly reflecting one's feeling of importance while finding names near the middle or bottom of the list may still be very difficult. Significance information should be used to select which names are shown first or on the top level, but order names alphabetically to make searching for a specific name easier and mitigating possible suggestions about people's relative importance.

Figure 8:
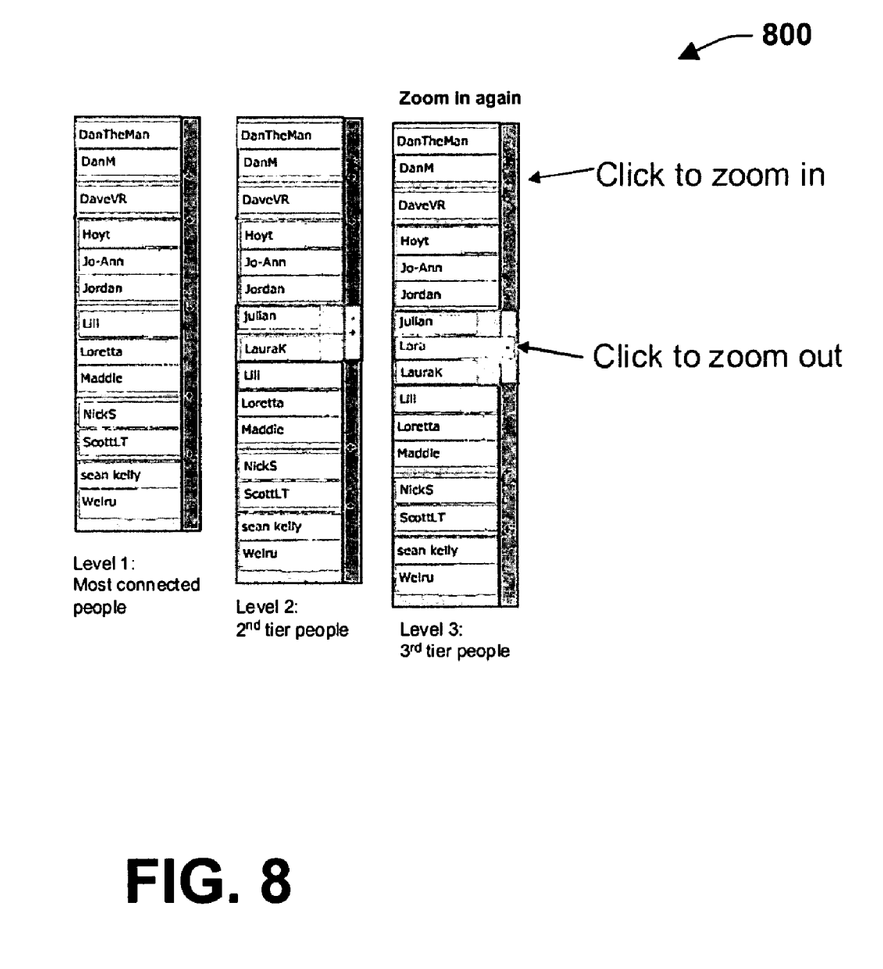

FIG. 8 is an example interface 800 that illustrates semi-collapsed lists for viewing associated people. This can include a hierarchical expansion of a people list which nevertheless is presented to the user as a single flat alphabetically ordered list. When the list is first shown, it only contains the top few (10-20) most significant names in an alphabetical order. This allows for a simple one-click access to the information about the most relevant people. At the same time, the top names act as dictionary bookmarks—each one can be expanded to show the names of the second level or other tertiary levels.

This is somewhat similar to the hierarchy expansion, except that all the expanded names are shown on the top level as peers to the first level names. The latter is provided to mitigate connotations that one person is above the other one, which may be perceived negatively if it does not follow the organization hierarchy, for example. List expansion can be continued until the names from the bottom of the significance list come into view. However, since the expansion can be performed on the selected areas of the list, the total number of the visible names can be limited, typically just in tens. At any given time, the visible names are sorted alphabetically and presented as a single list. This makes it easy to find a requested name. It is noted, that a semi-collapsed list can be applied to many different classifications, not just people. A few obvious ones include a list of keywords (categories), and a list of dictionary (encyclopedia) entries.

The idea to use existing entries as catalog indices is common. In fact, this is the standard way to organize printed dictionaries. However, in the standard dictionary approach, indices are put at the beginning and end of every page to indicate the content of that page. This can be described as a "constant space" between consecutive indices. The words chosen for indices are not particular in any way, they just happen to be at the beginning or end of the page.

In the present invention, the names chosen for indices are those that are on the top of an "importance" list. Using the dictionary analogy, these would be the words that are most frequently looked up. Moreover, these names are entries by themselves—clicking on the name selects it. This provides a one-click access to the most common entries, rather then scrolling to the page that contains the entry. On the other hand, there may be a variable number of second-order entries between indices. When the number of second-order entries is large enough, a third order index can be created, and so on.

Figure 9:
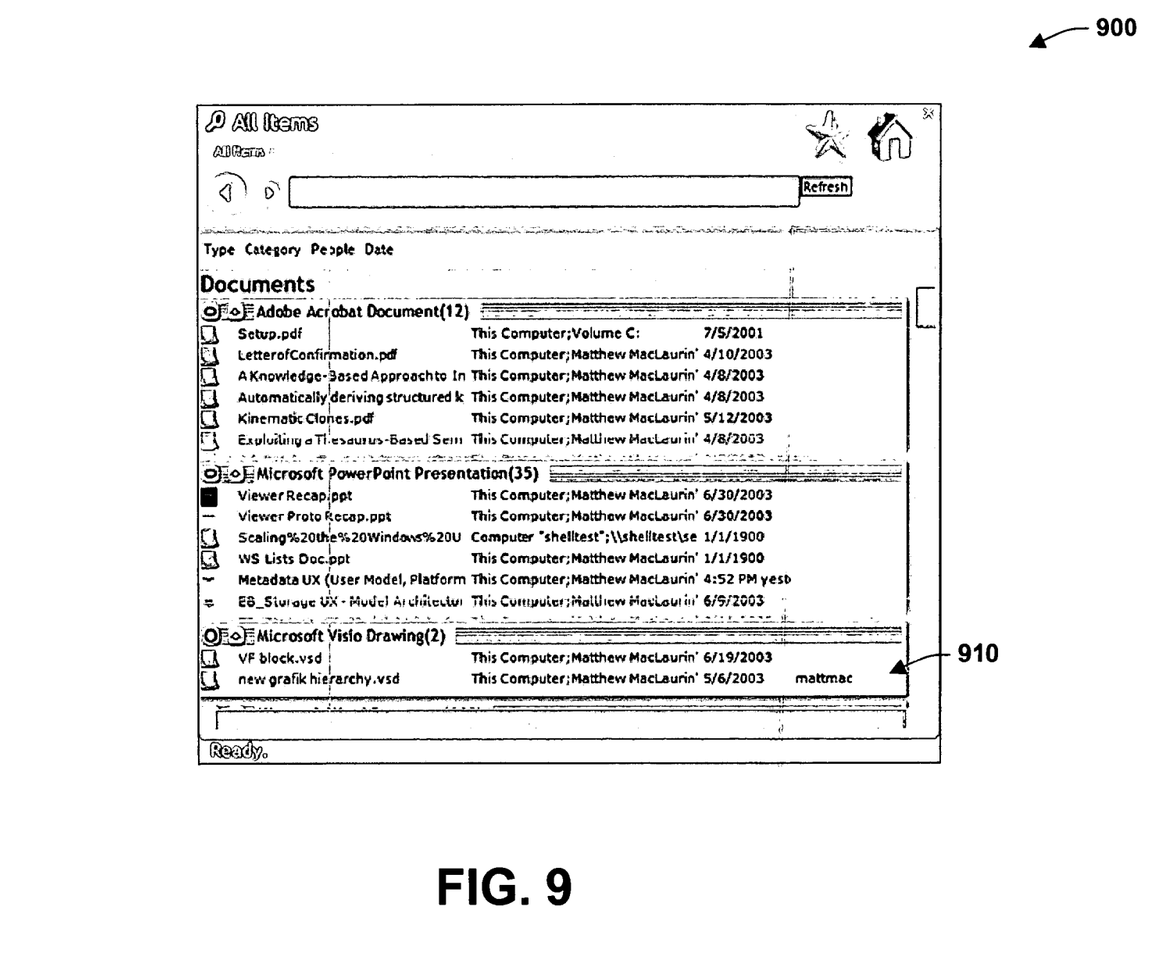
Figure 10:
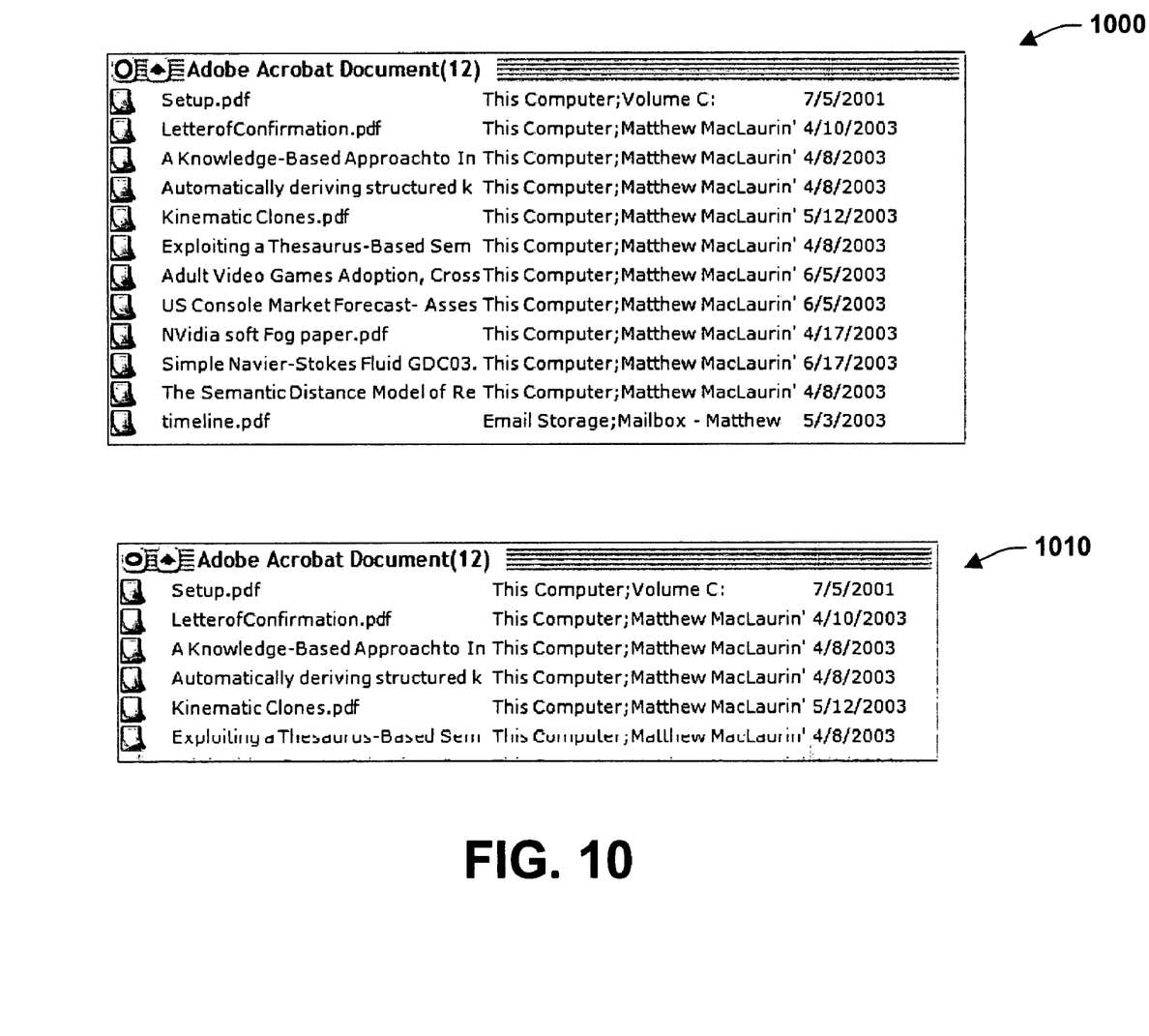

FIG. 9 illustrates semi-collapsed groups 900, whereas a group 1000 is shown in an expanded state in FIG. 10 when selected from the groups 900. FIG. 10 also depicts the group 1000 in a semi collapsed state at 1010. When presenting clusters (or other ways to group the items together) another question is how the clusters are visualized on the screen. Typical ways to visualize groups is to show some representation of the group as a whole (collapsed view), or the collection of all the items in the group (expanded view). In a standard Windows representation, with the folder list on the left and the item list on the right, can be thought of as an expanded view for the currently visible folder and a collapsed view for all other folders. Subfolders of the current folder are typically shown in a collapsed view, even if the thumbnail of the subfolder may contain a collage of a few items inside it. Sometimes more then one expanded group may be visible concurrently or when the items are shown grouped into stacks.

In file viewers which allow grouping and can display multiple groups concurrently, it is typical for the groups to be "collapsible"—the contents of a group may be individually shown or hidden. Nevertheless, the group can still exist in two states, and the expanded state allows interacting with the individual items in the group. In case of large groups, expanding one group obscures visibility of all others, which makes the multi-group view not as useful.

In the present invention, a third state is introduced which shows the first few items of the group—this is called the "squeezed" or "semi-collapsed" state of the group at 900. A single button is clicked repeatedly to cycle between expanded state at 1000, squeezed at 1010, and collapsed states at 900. The interface 900 is a File Viewer showing two semi-collapsed groups and the third small enough to be shown fully open at 910.

One advantage of the squeezed state is that the group takes up less room on the screen than an open state, but gives the user more information about the group than the closed state. This allows more groups to be visible while still providing detailed information about the contents of the group. The user can more quickly evaluate the groups in a large set of items, which in turn provides more efficient evaluation and manipulation of large groups of items.

A second advantage is that the collapsed state still provides direct one-click access to the few visible items. Assuming the visible items were selected by their "importance" to the user (e.g., most recent, or most often accessed in the past) the visible items are those for which the user is most likely looking. For example, to print a picture recently sent to somebody, the user can scroll to Pictures group and the file should be right on the top of the list (as the one of the most recently accessed). This may be compared to the current viewers—if the picture thumbnail is shown in the folder icon, the user would still need to open the folder to access the file. At the end, the squeezed view is about halfway between the collapsed and expanded ones: it tries to balance viewing and manipulating groups as whole with an access to individual items.

Since the semi-collapsed view provides a convenient way to access selected items from the group (without having to deal with all the items in it) users can be given control over which items show up in the semi-collapsed view and how many of the items appear. In one approach, the items may be sorted by a predetermined criteria and those items shown are from the top of the sorted list. The user may change the criteria to sort on and the number of elements shown. For example, a convenient and useful way to sort documents is by the last modification date. The semi-collapsed view may show the top n most recent documents from the list by default, and may have a button to show the next n. An alternative is to have a button to show the remaining documents from today, yesterday, last week, last month, etc. Typically, in all these cases, the order of the items shown is the same one used to limit the visible items. However, another approach is to order the items in a way most convenient to the user and not necessarily the same one as the criteria to select the items. For example, people are generally best sorted alphabetically, even if the selection order is by "importance."

The items in the squeezed group can be displayed as a semi-collapsed list. The semi-collapsed list can be selectively expanded to show more items. (Alternatively, the whole group can be expanded to show all items.) The semi-collapsed list view can be used for any type of items and when the sort order is different from the selection order. (can also use the semi-expanded list view if the sort and selection orders are the same). An example is a list of favorite songs sorted alphabetically. The user can expand parts of the list to show less popular songs, but the next songs coming into view will be selected by their popularity.

When creating a property hierarchy, higher level clusters typically include the content of all nested ones. For example, the Documents cluster includes all of Word Documents, Excel Worksheets, and so forth. Similarly, items from year 2003 include the items from individual months, which in turn include the individual days. Any container (cluster or folder) may be considered a standalone item, to be manipulated as a single entity, or merely a group of items, used to organize the view.

The primary function of the item browser is to enable easily finding of the requested item(s). However, traversing down property clusters is just one of the ways. The browsing functionality can be greatly enhanced by allowing for horizontal searches, which go to some related items rather then drilling down the property hierarchy. Moreover, the browser should allow for organizing items in any user-defined manner. When searching for items, users often work by associating the items together. For example, the exact date when the document was last edited may not be known, but the user may remember that it was just before an important meeting. The meeting itself may be easy to find, at which point the most relevant query is to "show all documents from the same date."

Figure 11:
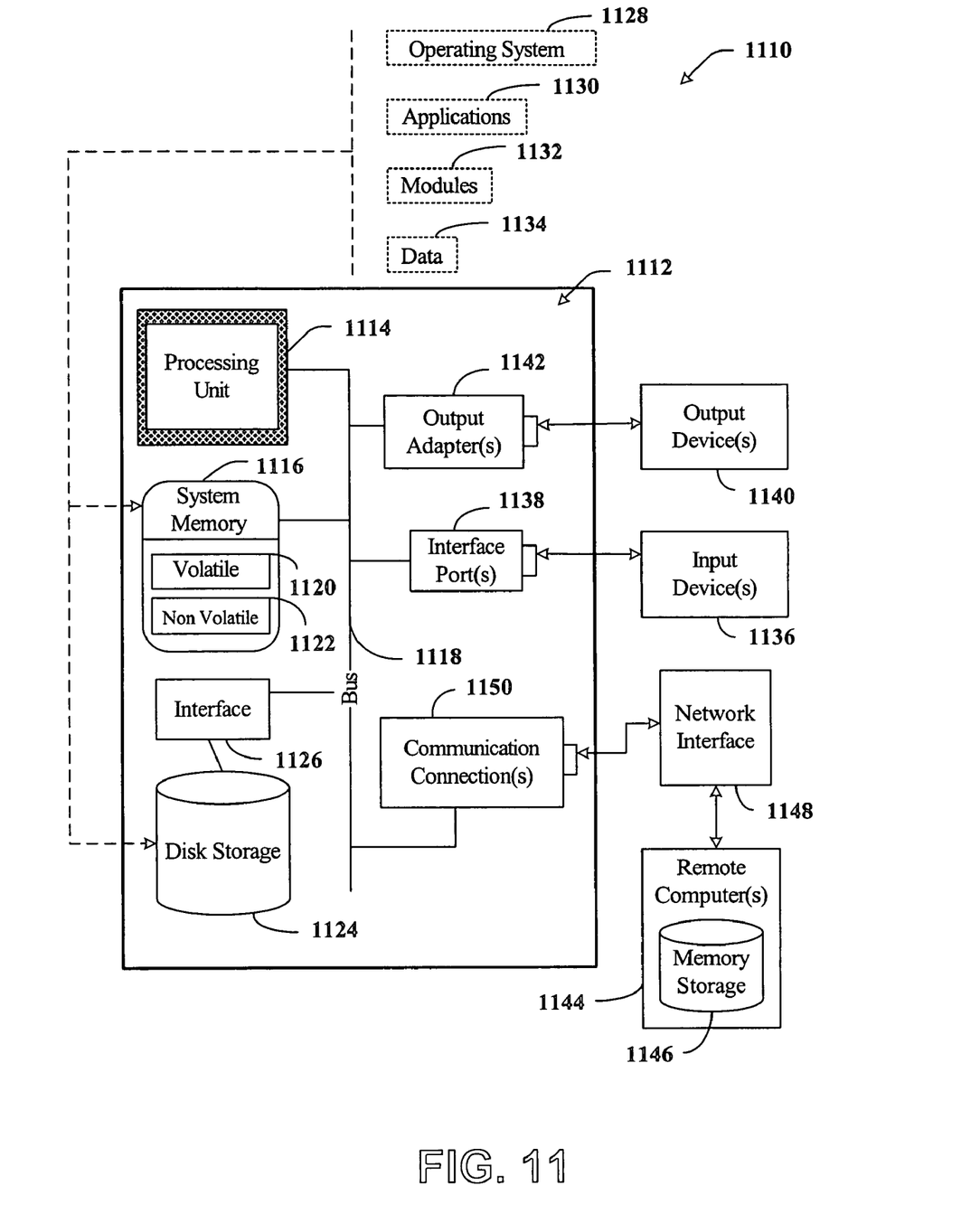
FIG. 11 is a schematic block diagram illustrating a suitable operating environment in accordance with an aspect of the present invention.

With reference to FIG. 11, an exemplary environment 1110 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 16-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

Figure 12:
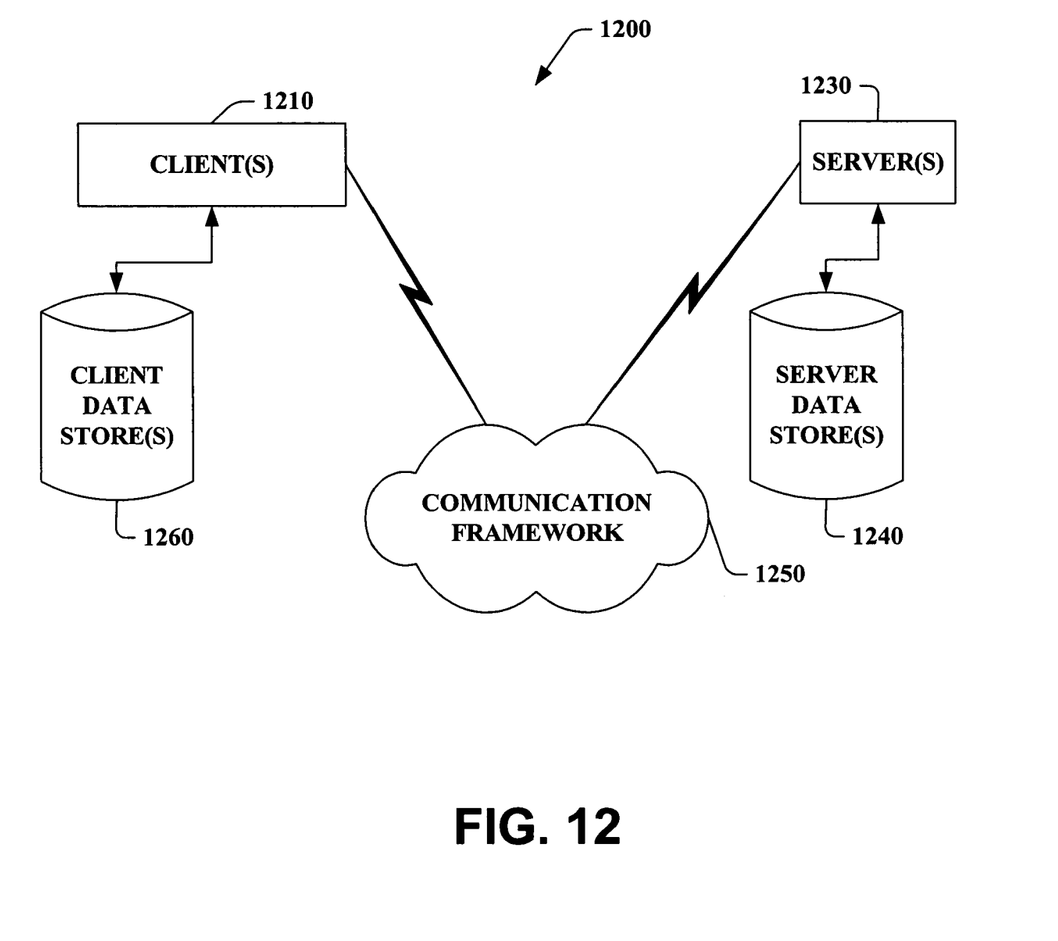
FIG. 12 is a schematic block diagram of a sample-computing environment with which the present invention can interact.

FIG. 12 is a schematic block diagram of a sample-computing environment 1200 with which the present invention can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the present invention, for example. One possible communication between a client 1210 and a server 1230 may be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computerized interface for data presentation, comprising:
   a property analyzer that determines an item distribution and forms a plurality of first-level clusters based in part on a first property of a plurality of properties, and automatically determines a respective item distribution for each other property of the plurality of properties, calculates a clusterization score for each other property based on the respective item distribution, and selects one other property having a highest clusterization score; and
   an organizer that automatically forms a plurality of new clusters based in part on the one other property, and presents the plurality of new clusters.

2. The interface of claim 1, the plurality of properties are associated with a plurality of items, the plurality of items are stored in at least one of a local or a remote storage location, or a combination thereof.

3. The interface of claim 2, the plurality of items include at least one of a document, a file, a folder, an image, an audio file, a video file, a code, a message, or a computer representation of external objects including people or locations, or a combination thereof.

4. The interface of claim 1, the plurality of properties comprises a type of an item, a date or time the item was created, people associated with the item, a location of the item, a category of the item, or a system, application, administrator or user-defined property of the item, or a combination thereof.

5. The interface of claim 1, the first property is a type of an item.

6. The interface of claim 1, the clusterization score is calculated in the following equation: clusterization score=$n\_items_{cluster1} * n\_items_{cluster2} * \ldots$, for all clusters associated with a particular property of the plurality of properties, where n_items is the number of items associated with a respective cluster.

7. The interface of claim 1, the clusterization score is calculated as follows: clusterization score=$(N\_total)! / ((n\_items_{cluster1})! * (n\_items_{cluster2})! * \ldots)$, for all clusters associated with a particular property of the plurality of properties, where N_total is the total number items of all clusters and n_items is the number of items associated with a respective cluster.

8. The interface of claim 1, further comprising a user interface to at least one of display cluster results, receive query selections, receive property information, or display information relating to an item in a cluster, or a combination thereof.

9. A computer readable medium having computer readable instructions stored thereon for implementing the property analyzer and the cluster organizer of claim 1.

10. A graphical user interface, comprising:
one or more data items and associated properties stored in a database;
one or more display objects created for each of the data items;
an input component for selecting the data items and the associated properties;
a property analyzer that forms a plurality of clusters based on a first property of a plurality of properties, and automatically calculates a clusterization score for each other property of the plurality of properties and selects one other property of the plurality of properties having a highest clusterization score, and determines a data item distribution based in part on the one other property;
an organizer component that creates new clusters and stores the display objects associated with the data items in a respective new cluster based on the one other property; and
a display component to present the display objects and the new clusters based in part on an automated analysis of the properties.

11. The interface of claim 10, further comprising controls for interacting with the properties.

12. The interface of claim 11, the properties are employed for nested querying of results.

13. The interface of claim 11, the properties include at least one of a type, a location, a category, a person, a date, a time, or a user-defined parameter, or a combination thereof.

14. The interface of claim 11, further comprising a component to learn implicitly from user actions.

15. The interface of claim 11, further comprising at least one semi-collapsed list or group.

16. The interface of claim 15, further comprising controls for expanding the list or group.

17. The interface of claim 16, where at least one large property cluster is presented in a squeezed view utilizing a semi-collapsed list.

18. A computerized interface for optimizing retrieval and display of information, comprising:
a property analyzer that determines an item distribution and forms a plurality of clusters based on a first property of a plurality of properties, automatically calculates a clusterization score for each other property of the plurality of properties and selects at least one other property of the plurality of properties based on the clusterization score associated with the at least one other property, and determines a distribution of a plurality of items based in part on the at least one other property; and
an organizer that automatically forms a plurality of optimized clusters and distributes the plurality of items in the plurality of optimized clusters based in part on the at least one other property, and presents the plurality of optimized clusters.

19. The interface of claim 18, the plurality of items are stored in at least one of a local or a remote storage location, or a combination thereof.

20. The interface of claim 19, the plurality of items comprise at least two of a document, a file, a folder, an image, an audio file, a video file, a code, a message, or a computer representation of external objects including people or locations, or a combination thereof.

21. The interface of claim 18, the plurality of properties comprises a type of the item, a date or time the item was created, people associated with the item, a location of the item, a category of the item, or a system, application, administrator or user-defined property of the item, or a combination thereof.

22. The interface of claim 21, the plurality of properties further comprises metadata.

23. The interface of claim 18, the property analyzer selects the at least one other property based on a highest clusterization score, the clusterization score is equal to the product of a number of items in a respective cluster multiplied by a number of items per cluster in each other respective cluster, or to a total number of items divided by the product of the factorial of a number of items in a respective cluster multiplied by the factorial of a number of items per cluster in each other respective cluster.

24. The interface of claim 18, at least one of the plurality of optimized clusters or the plurality of items, or a combination thereof, are presented in a semi-collapsed form based on a significance criteria.

* * * * *